United States Patent
Tsirkin et al.

(10) Patent No.: US 11,593,170 B2
(45) Date of Patent: Feb. 28, 2023

(54) FLEXIBLE REVERSE BALLOONING FOR NESTED VIRTUAL MACHINES

(71) Applicant: Red Hat, Inc., Raleigh, NC (US)

(72) Inventors: Michael Tsirkin, Westford, MA (US); David Hildenbrand, Grasbrunn (DE)

(73) Assignee: Red Hat, Inc., Raleigh, NC (US)

( * ) Notice: Subject to any disclaimer, the term of this patent is extended or adjusted under 35 U.S.C. 154(b) by 225 days.

(21) Appl. No.: 16/829,606

(22) Filed: Mar. 25, 2020

(65) Prior Publication Data

US 2021/0303356 A1    Sep. 30, 2021

(51) Int. Cl.
G06F 9/455 (2018.01)
G06F 9/46 (2006.01)
G06F 9/50 (2006.01)

(52) U.S. Cl.
CPC .......... *G06F 9/5016* (2013.01); *G06F 9/4555* (2013.01); *G06F 9/45558* (2013.01); *G06F 2009/45566* (2013.01); *G06F 2009/45579* (2013.01); *G06F 2009/45583* (2013.01)

(58) Field of Classification Search
CPC .. G06F 9/5016; G06F 9/4555; G06F 9/45558; G06F 2009/45566; G06F 2009/45579; G06F 2009/45583
USPC ...................................................... 718/104, 1
See application file for complete search history.

(56) References Cited

U.S. PATENT DOCUMENTS

| | | | |
|---|---|---|---|
| 7,433,951 B1* | 10/2008 | Waldspurger | G06F 9/5016 709/226 |
| 9,459,900 B2 | 10/2016 | Tsirkin | |
| 9,952,946 B2 | 4/2018 | Zhu et al. | |
| 10,162,663 B2 | 12/2018 | Takeuchi et al. | |
| 10,176,061 B2 | 1/2019 | Grobman et al. | |
| 10,430,261 B2 | 10/2019 | Farkas et al. | |
| 2014/0108764 A1* | 4/2014 | Li | G06F 12/123 711/171 |
| 2018/0260251 A1 | 9/2018 | Beveridge et al. | |
| 2019/0065087 A1* | 2/2019 | Li | G06F 1/3225 |
| 2019/0087368 A1* | 3/2019 | Bhandari | G06F 12/1027 |
| 2019/0171486 A1* | 6/2019 | Hildenbrand | G06F 9/5016 |
| 2020/0409740 A1* | 12/2020 | Li | G06F 21/44 |
| 2021/0211391 A1* | 7/2021 | Paraschiv | G06F 9/3877 |

OTHER PUBLICATIONS

Chen Haogang, Wang Xiaolin, Wang Zhenlin, Zhang Binbin, Luo Yingwei & Li Xiaoming "DMM: A Dynamic Memory Mapping Model for Virtual Machines"; Department of Computer Science, Peking University, Beijing; Department of Computer Science, Michigan Technological University, Houghton, USA; Jun. 2010 vol. 53, No. 6: 1097-1108; doi: 10.1007/s11432-010-3113-y; 12 Pages.

(Continued)

*Primary Examiner* — Bradley A Teets
(74) *Attorney, Agent, or Firm* — K&L Gates LLP

(57) ABSTRACT

A system includes a memory, at least one processor in communication with the memory, a guest hypervisor, and a host hypervisor executing on the at least one processor. The host hypervisor is configured to receive a request for additional memory, request the additional memory from a paravirtualized memory device, allocate the additional memory to the guest hypervisor, and report a status of the request. The status of the request is either a success status or a failure status.

20 Claims, 6 Drawing Sheets

(56) References Cited

OTHER PUBLICATIONS

Changwoo Min, Inhyuk Kim, Taehyoung Kim, Young Ik Eom; "Hardware Assisted Dynamic Memory Balancing in Virtual Machines"; School of Information & Communication Engineering, Sungkyunkwan University, Korea; Samsung Electronics, Korea; IEICE Electronics Express, vol. 8, No. 10, 748-754; Published May 25, 2011; 7 Pages.

\* cited by examiner

FLEXIBLE REVERSE BALLOONING FOR NESTED VIRTUAL MACHINES

BACKGROUND

The present disclosure relates generally to memory management of virtual machines. Virtualization may be used to provide some physical components as logical objects in order to allow running various software modules, for example, multiple operating systems, concurrently and in isolation from other software modules, on one or more interconnected physical computer systems. Virtualization may be achieved by running a software layer, often referred to as a hypervisor, above the hardware and below the virtual machines. An additional layer of nested virtual machines may be implemented to provide additional functionality to the virtual machine layer.

Computer systems may run virtual machines with memory allocated by a hypervisor. With memory overcommit, virtual machines and their associated guest operating systems may operate as if that they have access to more memory than is actually assigned by the hypervisor. When a guest operating system (OS) needs additional memory, the guest OS may use various techniques to free up additional memory.

SUMMARY

The present disclosure provides new and innovative systems and methods for flexible reverse ballooning for nested virtual machines. In an example, a system includes a memory, at least one processor in communication with the memory, a guest hypervisor, and a host hypervisor executing on the at least one processor. The host hypervisor is configured to receive a request for additional memory, request the additional memory from a paravirtualized memory device, allocate the additional memory to the guest hypervisor, and report a status of the request. The status of the request is a success status or a failure status.

In an example, a method includes receiving a request for additional memory and requesting the additional memory from a paravirtualized memory device. The method also includes allocating, by a host hypervisor, the additional memory to a guest hypervisor. Additionally, the method includes reporting, by the host hypervisor, a status of the request. The status of the request is a success status or a failure status.

In an example, a non-transitory machine readable medium stores code, which when executed by a processor, is configured to receive a request for additional memory, request the additional memory from a paravirtualized memory device, allocate the additional memory to a guest hypervisor, and report a status of the request. The status of the request is a success status or a failure status.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

Figure 1:
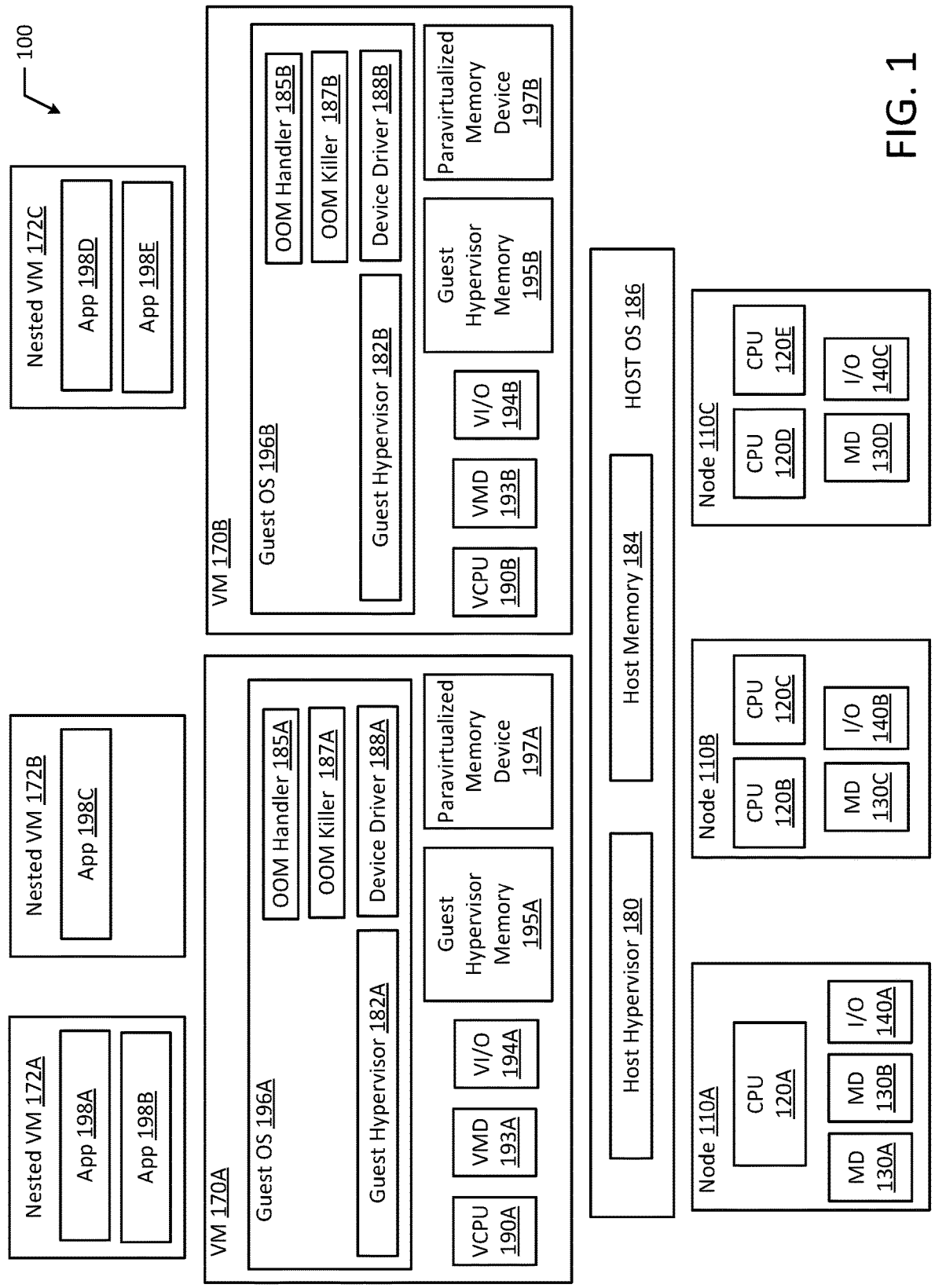
FIG. 1 illustrates a block diagram of an example computing system according to an example embodiment of the present disclosure.

Techniques are disclosed for flexible reverse ballooning for nested virtual machines. A guest operating system ("OS") in a virtual machine ("VM") can run a nested hypervisor or guest hypervisor that may launch nested virtual machines. Nested virtual machines provide benefits such as providing the ability to run a web server in a virtual machine, which can then put specific content processes in nested virtual machines. Nested VMs are also important for lightweight VMs such as kata containers.

When a nested hypervisor or guest hypervisor starts a new nested VM, the guest hypervisor allocates additional memory for the newly launched nested VM. Should allocating additional memory for the newly launched nested VM fail, the guest hypervisor may typically try to free up physical memory using various memory freeing techniques such as flushing caches and swapping memory. For example, an out of memory handler in the nested hypervisor or guest hypervisor may be activated to perform a cache flush or a memory swap.

With cache flushing, which may be used to eliminate memory pressure, unwritten data in cache may periodically be written to a drive to free up cache space. For example, memory pages used as cache may be written to a disk when the page is dirty. For pages that are not dirty, flushing cache causes the non-dirty pages to be evicted from cache, which may result in performance degradation. In an example, the guest hypervisor or host hypervisor may send a flush instruction down to the disk that forces the disk to write data in its cache to the disk. However, issuing flush instructions too frequently may have performance consequences because the information in the disk cache will have to be written to the disk media before the flush returns.

Additionally, memory swapping is a memory reclamation method where memory contents not currently in use are swapped to a disk to make the memory available for other applications or processes. Memory swapping may include creating a separate swap file for the virtual machine at VM startup. For example, the guest hypervisor may create the separate swap file. Then, if necessary, the guest hypervisor may directly swap out guest physical memory pages to the swap file, which frees host physical memory for other virtual machines. However, memory swapping has limitations on performance. For example, memory swapping may penalize guest performance because the hypervisor may not have any knowledge of which guest physical pages should be swapped out. The swapping may cause unintended interactions with the native memory management policies in the guest OS. Additionally, swapping in pages is computationally expensive for a virtual machine and may be associated with high swap-in latency. For example, if the hypervisor swaps out a guest page and the guest subsequently accesses that page, then the VM will get blocked until the page is swapped in from the disk. This high swap-in latency (e.g., up to tens of milliseconds) can severely degrade guest performance.

Both cache flushing and memory swapping are computationally expensive processes in regard to overall impact on system performance since moving data to and from the disk has considerable computational overhead. Additionally, flushing caches and/or memory swapping are problematic for multiple reasons including that these techniques negatively affect performance of VMs already running in the hypervisor, these memory freeing processes are not guaranteed to succeed, and utilizing these memory freeing processes may in turn result in noticeable lag or even data loss for user applications or may even cause the whole VM to become unusable or even crash.

In an example, monitoring techniques may detect the above described out of memory scenarios where a guest hypervisor is unable to free up enough memory to launch a nested VM. Specifically, a host hypervisor may detect that the guest hypervisor or nested hypervisor has little or no free physical memory and may add more memory to the virtual machine that the guest hypervisor is associated with. However, the core problem is that the memory freeing techniques (used by the guest hypervisor) and the monitoring techniques (used by the host hypervisor) are typically not synchronous. If the host hypervisor is unable to react fast enough, an out-of-memory handler ("OOM handler") and/or an OOM killer in the nested hypervisor may already be active before the host hypervisor has more time to add more memory to the virtual machine. As mentioned above, if more memory is needed by a guest hypervisor of a virtual machine, then the out-of-memory killer ("OOM killer") may be activated, which selects one or more processes to kill in order to free a greater amount of memory. However, using the OOM killer is problematic since the OOM killer may choose any process to kill, which may result in data loss for guest applications or even cause the system to become unstable or even crash.

A potential solution of the above problem is to use balloon devices to avoid the scenario where the host hypervisor fails to add memory in time. For example, a guest hypervisor may perform operations via a device driver such as a virtio-balloon driver. The virtio-balloon driver, also generally referred to as the device driver, may be used to inflate balloon devices, which then may be deflated to provide additional memory to the guest hypervisor when needed. However, typically the balloon device and driver solution is dependent on prior guest operation (e.g., a prior inflate operation) to make more memory available to the guest hypervisor and ultimately the nested virtual machines launched by the guest hypervisor.

With an ordinary device driver used in the virtio-balloon configuration, the driver will typically inflate the balloon device after the nested virtual machines start up, so that the balloon device may be deflated in case of out-of-memory situations. For example, the driver may automatically perform deflate operations when instructed by an OOM handler, making more memory available to the guest OS. However, the balloon device and device driver implementation has the disadvantage that a nested virtual machine typically has to be started with more memory than initially intended (e.g., unused memory sits in the balloon device until it is needed). Additionally, if the device driver does not start up in the guest OS to inflate the balloon initially, the guest OS might consume more memory than is requested.

If a balloon has not been inflated, it has no memory to return to the guest hypervisor. Additionally, the driver is limited in returning only the amount of memory that the balloon has been inflated to. Typically, the driver works on memory available to the system at boot time. If the guest hypervisor needs more memory, the driver or balloon are typically unable to take action to fulfil the additional memory needs of the guest hypervisor. Furthermore, in the above configuration, the hypervisor may be unable to deny a balloon deflate operation, which could potentially cause the host OS itself to run out of memory. Furthermore, it is often times difficult to determine what size to inflate the balloon to initially. If the balloon is inflated too much, then valuable memory sits unused in the balloon device. If the balloon is inflated too little, then the balloon is unable to satisfy future out-of-memory requests. The above virtio-balloon techniques and configurations also are problematic because they are not NUMA aware and cannot, for example, choose to request memory from a specific NUMA node.

As described in the various example embodiments disclosed herein, to prevent memory freeing techniques (e.g., a cache flush, a memory swap or other process performed by the OOM killer) from prematurely killing processes or performing a computationally expensive memory freeing processes, adding more memory to a nested virtual machine is performed synchronously, before the OOM killer is activated by the guest hypervisor. For example, a device driver may request paravirtualized memory devices ("PMDs") for more memory and each paravirtualized memory device may respond immediately, either indicating that more memory has been made available using the paravirtualized memory device, or that the paravirtualized memory device is unable to provide additional memory.

In an alternative example, an OOM handler may be activated to request paravirtualized memory devices for more memory. Once activated, the OOM handler looks for candidate paravirtualized memory devices that may be sent a request for additional memory (e.g., an out-of-memory request). In an example, out-of-memory requests may indicate the amount of memory needed and any other memory preferences (e.g., location of the device, type of device, size of device, etc.). The OOM handler may request (e.g., via a device driver) each located device for more memory. After receiving a request, each paravirtualized memory device may respond immediately, either indicating that more memory has been made available using the paravirtualized memory device, or that the paravirtualized memory device is unable to provide additional memory. If the paravirtualized memory device is unable to provide memory, the OOM handler may locate and request additional paravirtualized memory devices for additional memory.

A memory device may be a virtual memory device or a virtualized memory device. Additionally, a memory device may be a paravirtual device or a paravirtualized device (e.g., a paravirtualized memory device). Some paravirtualized devices decrease I/O latency and increase I/O throughput to near bare-metal (e.g., a bare-metal hypervisor or type-1 hypervisor that runs directly on the hardware and that hosts guest operating systems) levels, while other paravirtualized devices add functionality to virtual machines that is not otherwise available. Due to paravirtualized devices ability to decrease I/O latency and increase I/O throughput, paravirtualized devices (e.g., paravirtualized memory devices) may be better suited than emulated devices for virtual machines running I/O intensive applications. Paravirtualized memory devices may be high-performance virtual storage devices that provide storage to virtual machines. Additionally, paravirtualized memory devices may be associated with a virtual machine's RAM. In an example, a paravirtualized memory device may have the ability to resize the virtual machine address space. As discussed in the present specification, and unless otherwise indicated, a memory device may refer to a physical memory device, a virtualized memory device, and/or a paravirtualized memory device, as would be understood by those skilled in the art.

Once the device driver has been granted more memory from a paravirtualized memory device, the device driver may request to plug more memory chunks of device memory and make the newly granted physical memory usable by the guest operating system. At this point, the device driver (or alternatively the OOM handler) has successfully located more free physical memory and can report the newly granted physical memory to the guest operating system, thereby avoiding memory freeing techniques and/or the OOM killer all together.

Since the requesting and adding new physical memory to the virtual machine and adding the newly usable device memory to the nested virtual machine happens synchronously, memory freeing techniques (e.g., a cache flush, a memory swap or other process performed by the OOM killer) advantageously remain deactivated as long as a paravirtualized memory device can still provide additional memory. By reducing or eliminating the risk of the memory freeing techniques (e.g., a cache flush, a memory swap or other process performed by the OOM killer) from prematurely killing processes or performing a computationally expensive memory freeing processes which may result in data loss or cause the system to become unstable or crash, virtual machines and nested virtual machines may advantageously be started with a relatively small amount of memory. As the virtual machines need more memory (e.g., to launch additional nested virtual machines), the additional memory may be requested and added to the virtual machine and therefore to the guest hypervisor. The virtual machine memory size advantageously grows on demand without risking data loss or system instabilities. Additionally, the virtual machine memory size grows independent of prior guest operations and advantageously allows the guest hypervisor to go beyond its initial memory (which may be initially set at a relatively small amount to conserve system resources), to launch additional nested virtual machines based on network load (e.g., network traffic or network demand), according to a maximum configured by a system administrator.

FIG. 1 depicts a high-level component diagram of an example computing system 100 in accordance with one or more aspects of the present disclosure. The computing system 100 may include an operating system (e.g., host OS 186), one or more virtual machines (VM 170A-B), and nodes (e.g., nodes 110A-C).

Virtual machines 170A-B may include a guest OS(s), guest hypervisors, guest memory or virtual machine memory, a virtual CPU (VCPU), virtual memory devices (VMD), and virtual input/output devices (VI/O). The virtual machines 170A-B may also include paravirtualized memory devices. Each guest OS may include instances of device drivers associated with the paravirtualized memory devices. Additionally, each guest OS may activate an OOM handler and/or an OOM killer. For example, virtual machine 170A may include guest OS 196A, guest hypervisor 182A, guest memory or virtual machine memory 195A, a virtual CPU 190A, a virtual memory devices 193A, a virtual input/output device 194A, and paravirtualized memory device 197A. Virtual machine memory or guest hypervisor memory 195A may include one or more memory pages. Guest OS 196A may include device driver 188A associated with paravirtualized memory device 197A and Guest OS 196B may include device driver 188B associated with paravirtualized memory device 197B. Guest OS 196A or guest hypervisor 182A may activate OOM handler 185A or OOM killer 187A and Guest OS 196B may activate OOM handler 185B or OOM killer 187B. The OOM handler 185A may communicate with device drivers (e.g., device drivers 188A-B), which in return may communicate to the paravirtualized memory devices (e.g., paravirtualized memory devices 197A-B) and also the hypervisor 180.

Similarly, virtual machine 170B may include guest OS 196B, guest hypervisor 182B, guest memory or virtual machine memory 195B, a virtual CPU 190B, a virtual memory devices 193B, and virtual input/output device 194B, and paravirtualized memory devices 197B. Virtual machine memory or guest hypervisor memory 195B may include one or more memory pages. Guest OS 196B may include device driver 188B associated with paravirtualized memory device 197B. Guest OS 196B may activate OOM handler 185B or OOM killer 187B. Each of the guest hypervisors 182A-B, which may also be referred to as nested hypervisors may start and launch nested virtual machines 172A-C.

As illustrated, each guest OS (e.g., guest OS 196A) may have dedicated instances of a device driver (e.g., device driver 188A) per paravirtualized memory device (e.g., paravirtualized memory device 197A). In other examples, a device driver may manage multiple paravirtualized memory devices. The paravirtualized memory devices 197A-B may include persistent memory, which may be accessed using memory instructions or memory APIs after the end of a process.

The computing system 100 may also include a host hypervisor 180 and host memory 184. Host hypervisor 180 may manage host memory 184 for the host operating system 186 as well as memory allocated to the virtual machines 170A-B and guest operating systems 196A-C such as guest memory or virtual machine memory ("VM memory") 195A-B provided to guest OS 196A-C. Host memory 184 and virtual machine memory 195A-B may be divided into a plurality of memory pages that are managed by the hypervisor 180. Virtual machine memory 195A-B allocated to the guest OS 196A-C may be mapped from host memory 184 such that when a guest application 198A-D uses or accesses a memory page of virtual machine memory 195A-B, the guest application 198A-D is actually using or accessing host memory 184.

The host hypervisor 180 may control, account for, and limit memory allocation processes handled by the guest hypervisor 182 or device driver 188 (or alternatively the OOM handler 185). When a guest hypervisor 182 indicates that more memory is needed, the guest hypervisor 182 may communicate with the host hypervisor 180. In an example, the guest hypervisor 182 may communicate with PMDs 197 or the host hypervisor 180 via a device driver 188. In an example, the guest hypervisor 182 may activate the OOM handler (e.g., OOM handler 185A, hereinafter generally referred to as OOM handler 185). Once activated, the OOM handler 185 may be configured to request (e.g., send a request to) paravirtualized memory devices (e.g., paravirtualized memory devices 197A-B, hereinafter generally referred to as paravirtualized memory devices 197) for more memory. For example, the OOM handler 185 may look for paravirtualized memory devices 197 that are potential candidates to fulfill a request for additional memory (e.g., an out-of-memory request). The OOM handler 185 may request (e.g., via a device driver 188A-B, hereinafter generally referred to as device driver 188) each located paravirtualized memory device 197 for more memory.

After receiving a request, each paravirtualized memory device 197 may respond by indicating that more memory has been made available using the paravirtualized memory device 197 or that the paravirtualized memory device 197 is unable to provide additional memory. These responses may be communicated to the host hypervisor 180, which may report the status of the request to the guest hypervisor 182. If the paravirtualized memory device 197 is unable to provide memory, the guest hypervisor 182 or the OOM handler 185 may locate and request additional paravirtualized memory devices 197 for additional memory.

Once the guest hypervisor 182 (e.g., device driver 188) has been granted more memory from a paravirtualized memory device 197 (e.g., when a paravirtualized memory device 197 responds that more memory has been made available), the guest hypervisor 182 (e.g., device driver 188) may assign the memory to a nested virtual machine 172. For example, the guest hypervisor 182 (e.g., device driver 188) may request to plug more memory chunks of device memory and make the newly granted physical memory usable by the nested virtual machine 172. The guest hypervisor 182 may send out-of-memory requests via device drivers 188 to paravirtualized memory devices 197 to determine if more memory (e.g., "unavailable" memory) may be made "unusable". Once "unavailable" memory is made "unusable", the "unusable" memory may be turned into "usable" memory for the guest via a plug request.

As used herein, "unavailable" memory is memory that has not yet been made available for plugging. For example, first "unavailable" memory has to be made "unusable", which is available for plugging by the hypervisor (e.g., as a result of an OOM request from the guest OS 196) before it becomes "usable" memory, which can be used by the guest OS 196. For example, "unavailable" memory may become "unusable" memory, which may then be turned into "usable" memory by the guest OS 196 (e.g., via a plug request).

As used herein, "usable" memory is memory that is usable or made available to the guest OS (e.g., guest OS 196A-B). For example, initialization memory or memory used to initialize the virtual machine may be exposed to the guest OS 196 as "usable" memory that the guest uses to initialize. Additionally, device drivers 188 may add "usable" memory to the guest OS 196 from paravirtualized memory devices 197. Memory is "usable" as soon as the memory is plugged. For example, before the memory is reported to the guest OS 196, the memory is "usable" because the memory can be safely accessed. After the memory is plugged, the "usable" memory is reported to the guest OS 196. Reporting "unusable" or "unavailable" memory to the guest OS 196 may result in a system crash or failure.

Similarly, as used herein, "unusable" memory is memory that is currently not made available to the guest OS 196, but is available for plugging. For example, the memory of a paravirtualized memory device 197 is "unusable" memory to the guest hypervisor 182 and thus nested virtual machines 172 because the memory is not exposed to the guest hypervisor 182 and thus the guest hypervisor 182 is unable to use the memory. Once "unusable" memory is plugged, it becomes "usable" memory.

In an example, a virtual machine 170A may execute a guest operating system 196A and run nested virtual machines 172A-B (which run applications 198A-C), which may utilize the underlying VCPU 190A, VMD 193A, and VI/O device 194A. One or more nested VMs 172 may be running on a virtual machine 170A under the respective guest operating systems 196A. Additionally, one or more applications 198A-B may be running on a nested VM 172. A virtual machine (e.g., VM 170A-B, as illustrated in FIG. 1) may run on any type of dependent, independent, compatible, and/or incompatible applications on the underlying hardware and OS. In an example, applications (e.g., App 198A-B) run on a nested virtual machine 172A that is launched by a guest hypervisor 182A of a virtual machine 170A. The nested VM 172A (and the corresponding applications 198A-B) may be dependent on the underlying hardware and/or OS 186. In another example embodiment, applications 198A-B run on a nested virtual machine 172A that is launched by a guest hypervisor 182A of a virtual machine 170A, and the nested VM 172A and corresponding applications 198A-B may be independent of the underlying hardware and/or OS 186. For example, applications 198A-B run on a first nested VM 172A may be dependent on the underlying hardware and/or OS 186 while application(s) 198C) run on a second nested VM 172B are independent of the underlying hardware and/or OS 186. Additionally, applications 198A-B run on a nested VM 172A may be compatible with the underlying hardware and/or OS 186. In an example embodiment, applications 198A-B run on a nested VM 172A may be incompatible with the underlying hardware and/or OS 186. For example, applications 198A-B run on one nested VM 172A may be compatible with the underlying hardware and/or OS 186 while application(s) 198C run on another nested VM 172B are incompatible with the underlying hardware and/or OS 186. In an example embodiment, a device may be implemented as a virtual machine (e.g., virtual machine 170A-B).

The computer system 100 may include one or more nodes 110A-C. Each node 110A-C may in turn include one or more physical processors (e.g., CPU 120A-E) communicatively coupled to memory devices (e.g., MD 130A-D) and input/output devices (e.g., I/O 140A-C). Each node 110A-C may be a computer, such as a physical machine and may include a device, such as hardware device. In an example, a hardware device may include a network device (e.g., a network adapter or any other component that connects a computer to a computer network), a peripheral component interconnect (PCI) device, storage devices, disk drives, sound or video adaptors, photo/video cameras, printer devices, keyboards, displays, etc. Virtual machines 170A-B may be provisioned on the same host or node (e.g., node 110A) or different nodes. For example, VM 170A and VM 170B may both be provisioned on node 110A. Alternatively, VM 170A may be provided on node 110A while VM 170B is provisioned on node 110B. Nodes 110A-C may be non-uniform memory access ("NUMA") nodes.

In an example, device memory may be located on paravirtualized memory devices 197A-B. Each paravirtualized memory device 197A-B may be associated with a memory region (e.g., a start address and an end address in the memory region). Additionally, each paravirtualized memory device 197A-B may be associated with a respective NUMA node (e.g., nodes 110A-C) or may be aware of the host's non-uniform memory access topology. For example, paravirtualized memory device 197A may be associated with node 110A and paravirtualized memory device 197B may be associated with node 110B. The present systems and methods are fully NUMA aware and are expected to be faster than existing balloon implementations.

As used herein, physical processor or processor 120A-E refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 130A-D refers to a volatile or non-volatile memory device, such as RAM, ROM, EEPROM, or any other device capable of storing data. As discussed herein, I/O device 140A-C refers to a device capable of providing an interface between one or more processor pins and an external device capable of inputting and/or outputting binary data.

Processors 120A-E may be interconnected using a variety of techniques, ranging from a point-to-point processor interconnect, to a system area network, such as an Ethernet-based network. Local connections within each node, including the connections between a processor 120A-E and a memory device 130A-D may be provided by one or more local buses of suitable architecture, for example, peripheral component interconnect (PCI).

Figure 2:
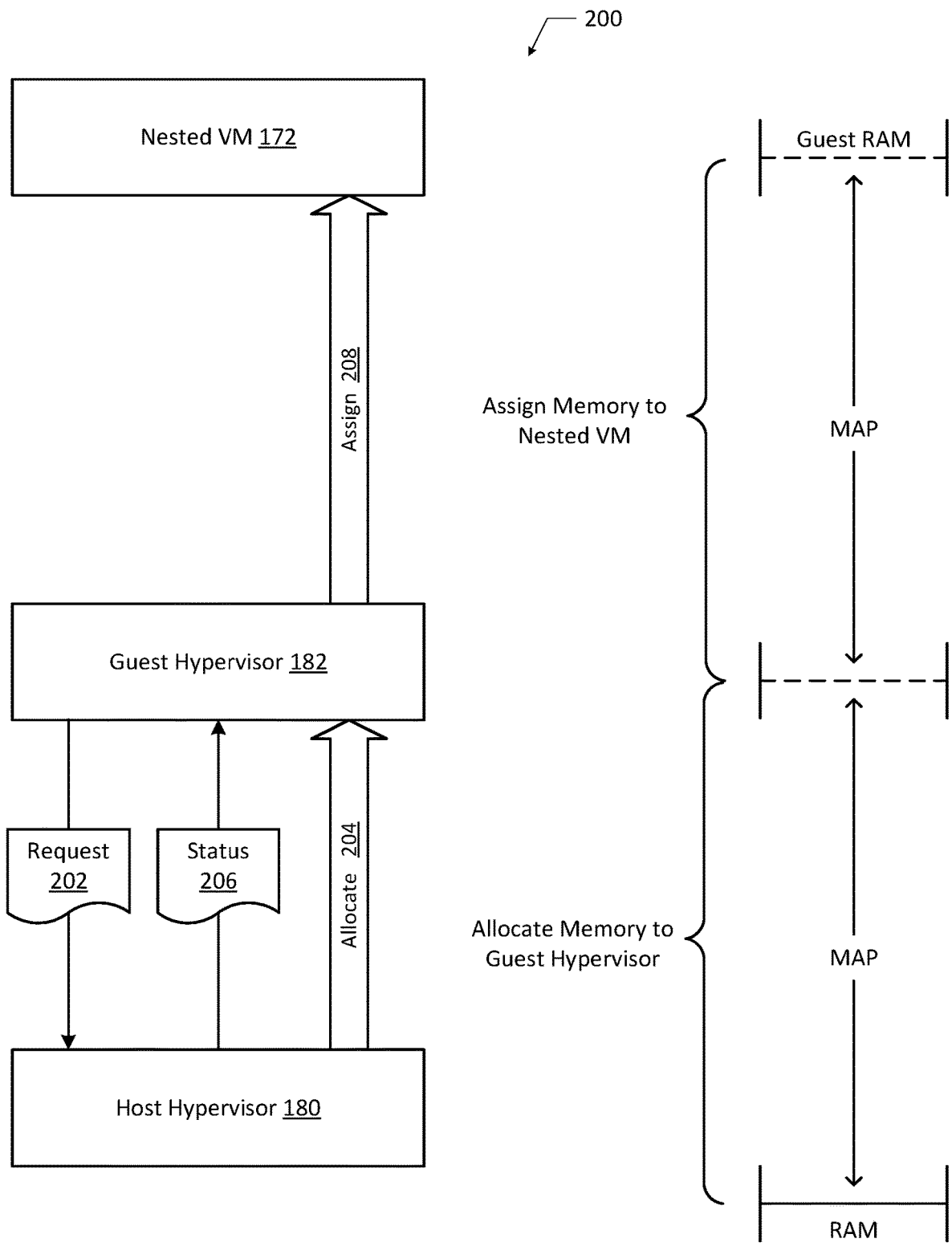
FIG. 2 illustrates a block diagram of memory allocation according to an example embodiment of the present disclosure.

FIG. 2 illustrates a block diagram of flexible reverse ballooning for nested virtual machines. As illustrated in FIG. 2, a host hypervisor 180 is extended with the ability to receive requests (e.g., request 202) from the guest hypervisor 182 or generally the guest (e.g., guest OS 196). The host hypervisor 180 may also allocate memory to the guest hypervisor 182 through an allocate 204 process. Furthermore, the host hypervisor 180 may report a success or failure (e.g., report status 206 to guest hypervisor 182) of allocating additional memory to the guest hypervisor 182.

For example, when a guest hypervisor 182 is requested to launch a nested VM 172, the guest hypervisor may look for a paravirtualized memory device 197 that applies for the nested VM 172. For example, a suitable paravirtualized memory device 197 may be a device that is able to provide more memory or may be a device that is associated with a specific NUMA node. The guest hypervisor 182 may use the appropriate paravirtualized memory device 197 to request more memory from the host hypervisor 180. In an example, a request 202 may be communicated to the host hypervisor 180 via the paravirtualized memory device 197 or a device driver 188 associated with the guest hypervisor 182.

Typically, the host hypervisor 180 will respond immediately, either reporting that more memory has been made available using the paravirtualized memory device 197 (e.g., reporting a success status 206) or that no more memory can be provided using the paravirtualized memory device 197 (e.g., reporting a failure status 206). If no more memory can be provided, creating or launching the nested VM 172 by the guest hypervisor 182 may fail. Upon failure, the guest hypervisor 182 may attempt to create or launch the nested VM 172 with a different configuration (e.g., another NUMA node, less memory, etc.). For example, the guest hypervisor 182 may send a request 202 that specifies a different NUMA node or may send a request 202 that requests for less additional memory to launch the nested VM 172.

If additional memory is available and allocated via allocation process 204, and the guest hypervisor 182 (the guest OS 196 generally or associated device driver 188) is granted more memory from the paravirtualized memory device 197, the guest hypervisor 182 (the guest OS 196 generally or associated device driver 188) may assign the memory to the nested VM 172 via a memory assign 208 process. The requesting and adding new physical memory to the virtual machine 170 associated with the guest hypervisor 182 and adding the newly usable device memory to the nested VM 172 happens synchronously before creating the nested VM 172. In particular, memory is assigned to the nested VM 172 without allocating per-page data structures within the guest hypervisor 182. In this way, the OOM handler or the OOM killer remains inactive as long as the guest hypervisor 182 only launches and runs nested VMs 172 when the paravirtualized memory device can provide more memory. Specifically, the guest hypervisor 182 is programmed in such a way that passing or assigning memory to the nested VM 172 occurs without trying to allocate new memory in the guest hypervisor 182 as the guest hypervisor 182 is already out of memory.

Since the requesting and adding new physical memory to the VM 170 and assigning the newly usable device memory to the nested VMs 172 happens synchronously from the OOM handler 185, the OOM killer 187 advantageously remains deactivated as long as a paravirtualized memory device 197 can still provide additional memory. By reducing or eliminating the risk of the OOM killer 187 killing processes which may result in data loss or cause the system to become unstable or crash, VMs 170 and nested VMs 172 may be started with a relatively small amount of memory. As the VMs 170 and nested VMs 172 need more memory, the additional memory may be requested by a guest hypervisor 182 and added to the VM and therefore to the nested VMs 172. For example, as nested VMs 172 are started, more memory is requested and added to the VMs 170 and therefore to the guest hypervisors 182. The virtual machine memory size advantageously grows on demand without risking data loss or system instabilities. Additionally, the virtual machine memory size grows independent of prior guest operations and advantageously allows the VMs 170 and nested VMs 172 to go beyond their initial memory (which may be initially set at a relatively small amount to conserve system resources) according to a maximum configured by a system administrator. Furthermore, the entire process can be controlled, accounted for and limited by the host hypervisor 180.

Figure 3:
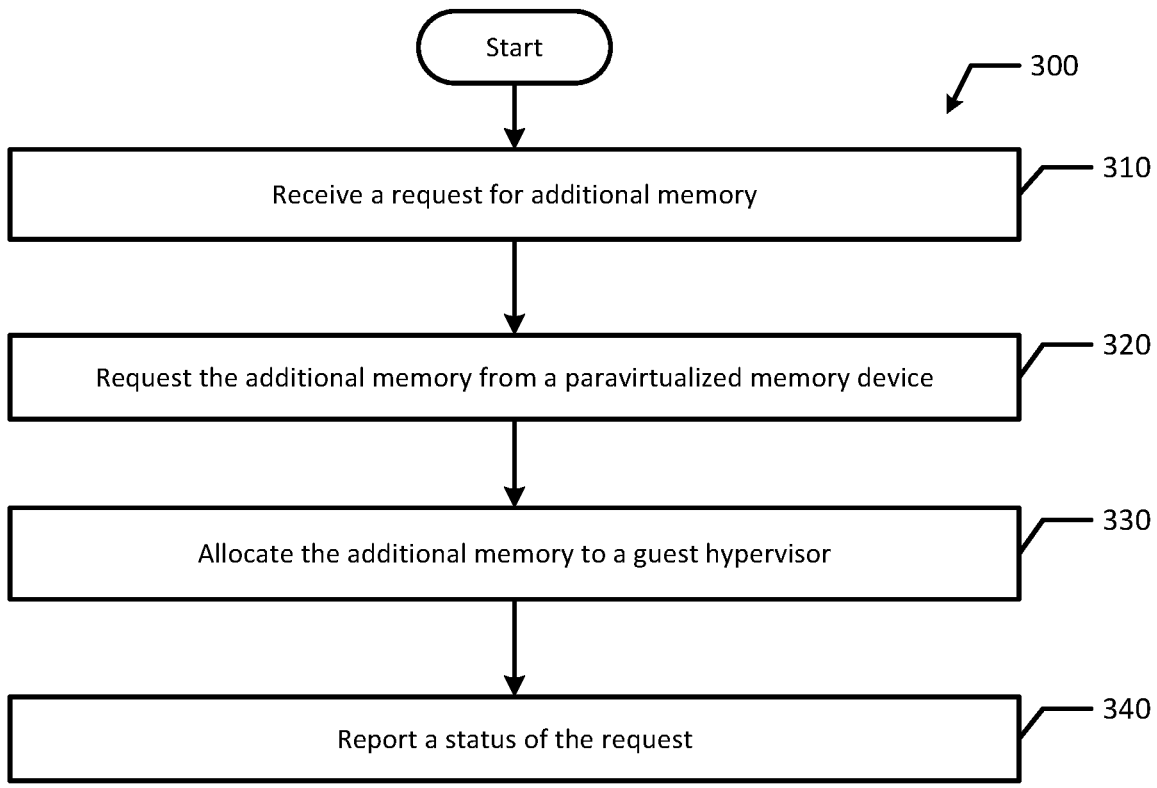
FIG. 3 illustrates a flowchart of an example process for flexible reverse ballooning for nested virtual machines according to an example embodiment of the present disclosure.

FIG. 3 illustrates a flowchart of an example method 300 for flexible reverse ballooning for nested virtual machines according to an example embodiment of the present disclosure. Although the example method 300 is described with reference to the flowchart illustrated in FIG. 3, it will be appreciated that many other methods of performing the acts associated with the method 300 may be used. For example, the order of some of the blocks may be changed, certain blocks may be combined with other blocks, one or more blocks may be repeated, and some of the blocks described are optional. The method 300 may be performed by processing logic that may comprise hardware (circuitry, dedicated logic, etc.), software, or a combination of both.

The example method 300 includes receiving a request for additional memory (block 310). For example, a PMD 197 or a host hypervisor 180 may receive a request for additional memory from a guest hypervisor 182. In an example, the request may be sent by device driver 188. Method 300 also includes requesting the additional memory from a paravirtualized memory device (block 320). For example, the host hypervisor 180 or the device driver 188 may request the additional memory from the PMD 197. In an example, the request may be an out-of-memory request. The request may indicate the amount of memory needed and any other memory preferences (e.g., location of the PMD 197, type of PMD 197, size of PMD 197, etc.).

Additionally, method 300 includes allocating the additional memory to a guest hypervisor (block 330). For example, the host hypervisor 180 may allocate the additional memory to the guest hypervisor 182. Method 300 also includes reporting a status of the request (block 340). For example, the host hypervisor 182 may report the status of the request. The status of the request may be a success status or a failure status. In an example, the host hypervisor 180 will respond immediately by reporting that more memory has been made available using the PMD 197 (e.g., reporting a success status) or that no more memory can be provided using the PMD 197 (e.g., reporting a failure status).

Figure 4A:
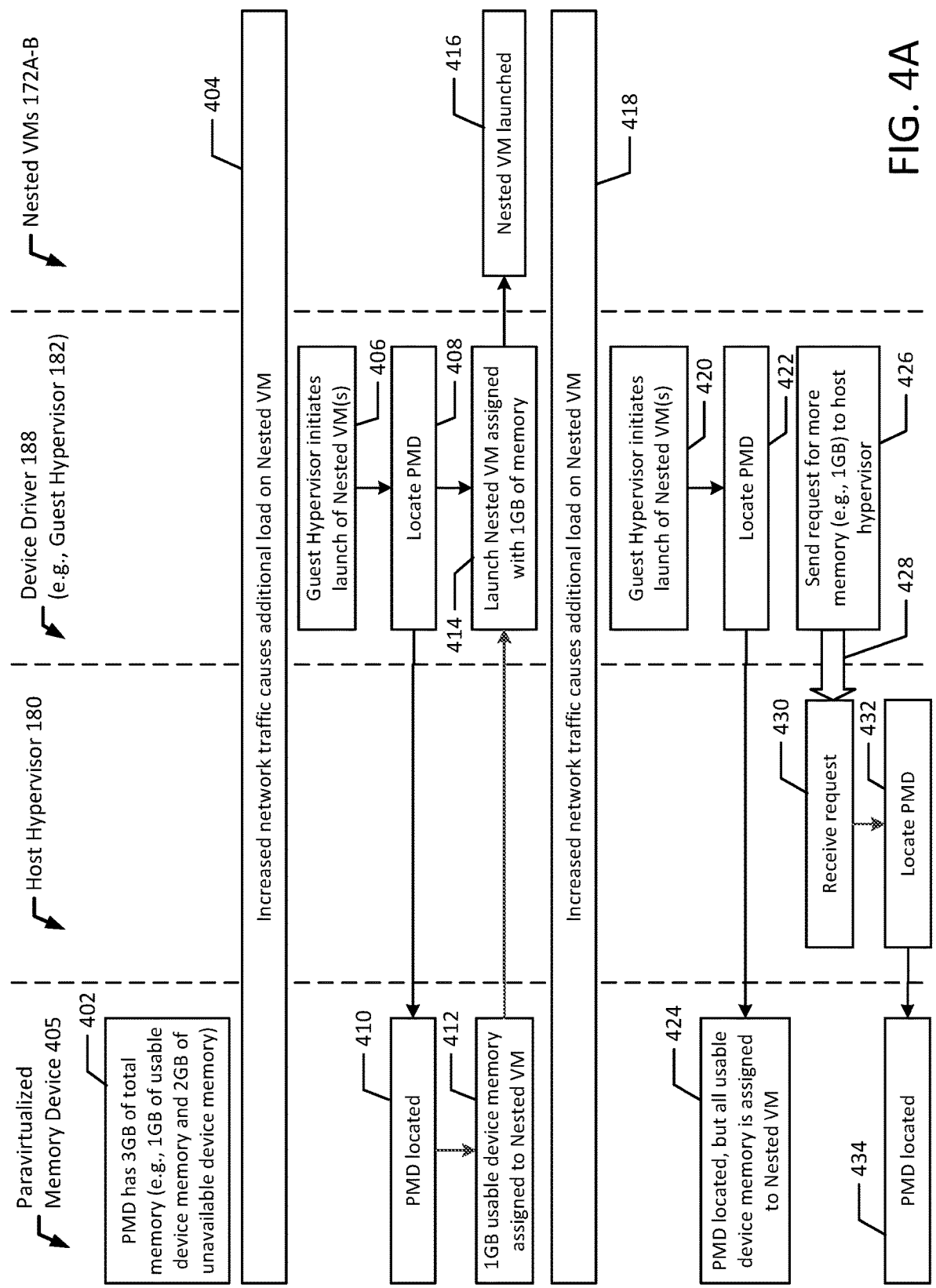
FIGS. 4A and 4B illustrate a flow diagram of an example process for dynamically allocating (e.g., increasing) memory available to nested virtual machines according to an example embodiment of the present disclosure.
Figure 4B:
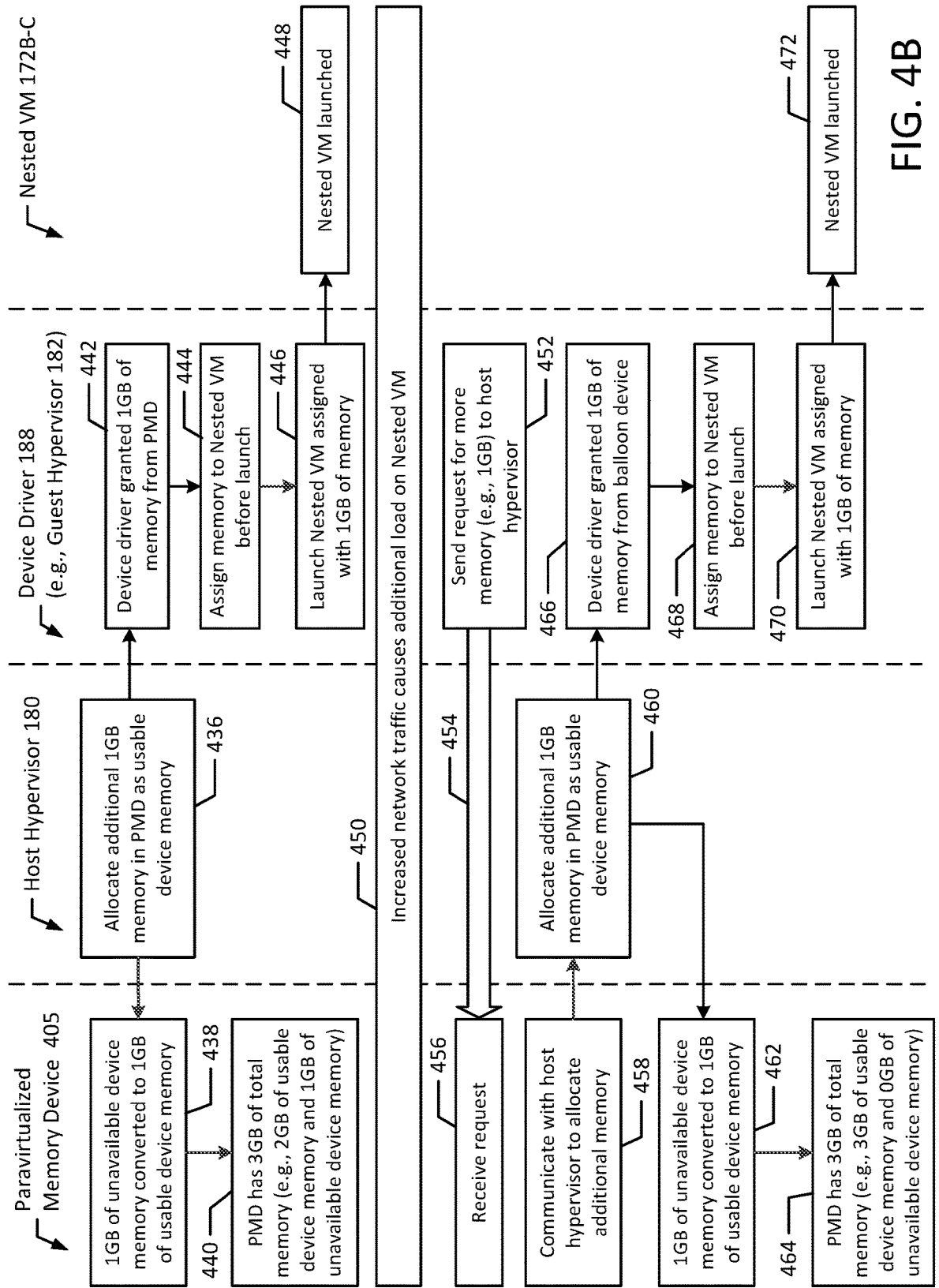

FIGS. 4A and 4B illustrate a flowchart of an example method 400 for dynamically allocating (e.g., increasing) memory available to nested virtual machines in accordance with an example embodiment of the present disclosure. Although the example method 400 is described with reference to the flowchart illustrated in FIGS. 4A and 4B it will be appreciated that many other methods of performing the acts associated with the method 400 may be used. For example, the order of some of the blocks may be changed, certain blocks may be combined with other blocks, one or more blocks may be repeated, and some of the blocks described are optional. For example, a host hypervisor 180, a device driver 188 or a guest hypervisor 182 and a paravirtualized memory device 405 communicate to perform example method 400 and to dynamically allocate additional memory for launching nested virtual machines 172.

In the illustrated example, paravirtualized memory device 400 has 3 GB of total memory (e.g., 1 GB of usable device memory and 2 GB of unavailable device memory) (block 402). For example, paravirtualized memory device 405 may be initialized with 3 GB of total memory. Increased network traffic may cause additional load on a nested virtual machine 172 (block 404). For example, applications (e.g., applications 198A-B) running on nested virtual machine 172 may be unable to handle the additional requests associated with the increased network traffic. The increased network traffic may require applications to store, send and/or receive additional packets of data, which may require more RAM or additional applications instances to help meet the increased demand.

In the illustrated example, a guest driver 188 or a guest hypervisor 182 initiates launching additional nested VMs 172A (block 406). For example, the guest driver 188 or the guest hypervisor 182 tries to find the additional memory (e.g., free physical memory) to launch the nested VM 172A. As illustrated in FIG. 4A, the guest driver 188 locates PMD 405 (block 408). PMD 405 may be located based on size, location, and/or other preferences. The PMD 405 is located (block 410) and 1 GB of usable device memory is assigned to the nested VM (block 412). Prior to assigning the memory, the PMD may respond and indicate whether the PMD is capable of providing the additional memory. Now, the guest driver 188 or the guest hypervisor 182 launches the nested VM 172A, which is assigned the 1 GB of memory (block 414). The nested VM 172A is launched and my start running additional applications to help with the increased network traffic (block 416). Nested VM 172A may enable an underlying virtual machine (e.g., VM 170A) to run a web server such that the content the web server processes can be managed by separate nested VMs. For example, nested VM 172A may serve as a web server that processes and serves web requests.

Again, increased network traffic may cause additional load on a nested virtual machine 172A (block 418). For example, applications (e.g., applications 198A-B) running on nested virtual machine 172A may be unable to handle the additional web requests associated with the increased network traffic. The increased network traffic may require applications to store, send and/or receive additional packets of data, which may require more RAM or additional applications instances to help meet the increased demand.

In the illustrated example, a guest driver 188 or a guest hypervisor 182 initiates launching additional nested VMs 172B (block 420). For example, the guest driver 188 or the guest hypervisor 182 tries to find the additional memory (e.g., free physical memory) to launch the nested VM 172B. As illustrated in FIG. 4A, the guest driver 188 locates PMD 405 (block 422). In the illustrated example, PMD 405 may be located based on its previous ability to provide memory to nested VM 172A. The PMD 405 is located, but all the usable device memory is already assigned to nested VM 172A (block 424). For example, the PMD 405 may indicate that the PMD 405 is unable to provide the additional memory (e.g., either partially or fully). In some examples, multiple PMDs 40 may each provide portions of the additional memory.

Next, the guest driver 188 or a guest hypervisor 182 sends a request 428 for more memory (e.g., 1 GB) to the host hypervisor 180 (block 426). The request 428 (e.g., out-of-memory request) may specify that the memory should be from a PMD 405 on the same node as nested VM 172A-B that the request originated from. The host hypervisor 180 receives the request 428 (block 430). The host hypervisor 180 may review various criteria associated with the request 428. After receiving the request 428, the host hypervisor 180 locates the PMD 405 (block 432). PMD 405 may be located and/or ranked based on criteria. For example, PMD 405 may be located based on device location, device size, and history information from previous requests 428 (e.g., out-of-memory requests). If during a previous search, the PMD 405 indicated that additional memory was unavailable, then the PMD 405 may be ranked lower and may be request for additional memory after other devices are first requested. Similarly, if the PMD 405 indicated that additional memory was available during a previous inquiry that PMD 405 may be requested again, prior to requesting other PMDs. The PMD is located (block 434). The PMD 405 may have been identified as a potential candidate to fulfill the request 428 (e.g., due to the PMD's location, size, or based on some other ranking criteria). Continuing on FIG. 4B, the host hypervisor 180 allocates an additional 1 GB of memory in the PMD 405 as usable device memory (block 436). In an example, the PMD 405 may respond to the request 428 and indicate whether the PMD 405 is capable of satisfying the request 428 (e.g., either partially or fully). In some examples, multiple PMDs 405 may each partially satisfy the request 428.

In other examples, the host hypervisor 180 may deny the request 428 in case the operation cannot be satisfied without incurring problems in the host OS. Additionally, requests 428 may be denied if the host hypervisor 180 suspects the requests 428 are malicious. For example, an affected guest hypervisor 182 may continue to request additional memory for malicious applications.

By allocating the additional 1 GB of memory in the PMD 405, 1 GB of unavailable device memory is converted to 1 GB of usable device memory (block 438). Now, the PMD 405 has 3 GB of total memory with 2 GB of usable device memory and 1 GB of unavailable device memory (block 440). The device driver 188 is granted the 1 GB of now usable device memory from the PMD 405 (block 442). The requesting (e.g., via request 428) and adding new physical memory to the virtual machine (e.g., VM 170A) associated with the device driver 188 occurs before creating the nested VM 172B.

The device driver 188 or the guest hypervisor 182 may then assign the memory to the nested VM 172B prior to launch (block 444). Then, the device driver 188 or guest hypervisor 182 launches the nested VM 172B (block 446). For example, the requesting (e.g., via request 428) and adding new physical memory to the virtual machine (e.g., VM 170A) associated with the device driver 188 and then assigning the memory to the nested VM 172B happens synchronously. Therefore, the memory is assigned to the nested VM 172B without allocating per-page data structures, such as a struct page, within the guest hypervisor 182. The nested VM 172B is launched and my start running additional applications to help with the increased network traffic (block 448). For example, VM 172B may provide additional bandwidth and web server support to the underlying VM (e.g., VM 170A).

Again, increased network traffic may cause additional load on the nested virtual machines 172A-B (block 450). For example, applications (e.g., applications 198A-B) running on nested virtual machine 172B may be unable to handle the additional web requests associated with the increased network traffic.

In an example, the guest driver 188 or a guest hypervisor 182 sends a request 454 for more memory (e.g., 1 GB) to the PMD 405 (block 452). The request 454 (e.g., out-of-memory request) may specify that the memory should be from a PMD 405 on the same node as nested VM 172A-B that the request originated from. The PMD 405 receives the request 454 (block 456). The PMD 405 may communicate with the host hypervisor 180 to allocate additional memory (block 458). For example, the PMD 405 may receive the request 454 and may communicate the request to the host hypervisor 180. The request 454 may be initially sent or routed to PMD 405 based on the same criteria discussed above.

After receiving the request 454, an additional 1G of memory in the PMD 405 is allocated as usable device memory (block 460). In an example, the host hypervisor 180 allocates an additional 1 GB of memory in the PMD 405 as usable device memory. By allocating the additional 1 GB of memory in the PMD 405, 1 GB of unavailable device memory is converted to 1 GB of usable device memory (block 462). Now, the PMD 405 has 3 GB of total memory with 3 GB of usable device memory and 0 GB of unavailable device memory (block 464). In an example, the PMD 405 may indicate that all of its memory is being used, which may lower the ranking of the PMD so that future requests may be routed to other PMDs 405.

The device driver 188 is granted the 1 GB of now usable device memory from the PMD 405 (block 466). Similar to request 428, the requesting (e.g., via request 454) and adding new physical memory to the virtual machine (e.g., VM 170A) associated with the device driver 188 occurs before creating the nested VM 172C. The device driver 188 or the guest hypervisor 182 may then assign the memory to the nested VM 172C prior to launch (block 468). Then, the device driver 188 or guest hypervisor 182 launches the nested VM 172C (block 470). The requesting and adding new physical memory to the virtual machine 170 associated with the guest hypervisor 182 and adding the newly usable device memory to the nested VM 172C happens synchronously before creating the nested VM 172C. In particular, memory is assigned to the nested VM 172C without allocating per-page data structures within the guest hypervisor 182. In this way, memory freeing techniques are avoided as long as the guest hypervisor 182 only launches and runs nested VMs 172A-C when the PMD 405 can provide more memory.

The nested VM 172C is launched and may start running additional applications to help with the increased network traffic (block 472). For example, VM 172C may provide additional bandwidth and web server support to the underlying VM (e.g., VM 170A). When network traffic decreases, some of the newly launched nested VMs 170A-C may be stopped or killed to allocate system resources to other processes or other nested VMs.

Since the requesting and adding new physical memory to the virtual machine and adding the newly usable device memory to the nested VMs (e.g., nested VMs 172A-C) happens synchronously, memory freeing techniques (e.g., a cache flush, a memory swap or other process performed by the OOM killer) advantageously remain deactivated as long as the PMD 405 (or another PMD) can still provide additional memory. By reducing or eliminating the risk of the memory freeing techniques (e.g., a cache flush, a memory swap or other process performed by the OOM killer) from prematurely killing processes or performing a computationally expensive memory freeing processes which may result in data loss or cause the system to become unstable or crash, nested VMs 172A-C may advantageously be started with a relatively small amount of memory. As the guest hypervisor 182 needs more memory (e.g., to launch additional nested VMs 172A-C), the additional memory may be requested and added to the virtual machine. The virtual machine memory size advantageously grows on demand without risking data loss or system instabilities. Additionally, the virtual machine memory size grows independent of prior guest operations and advantageously allows the guest hypervisor to go beyond its initial memory (which may be initially set at a relatively small amount to conserve system resources), to launch additional nested virtual machines based on network load (e.g., network traffic or network demand), according to a maximum configured by a system administrator.

Figure 5:
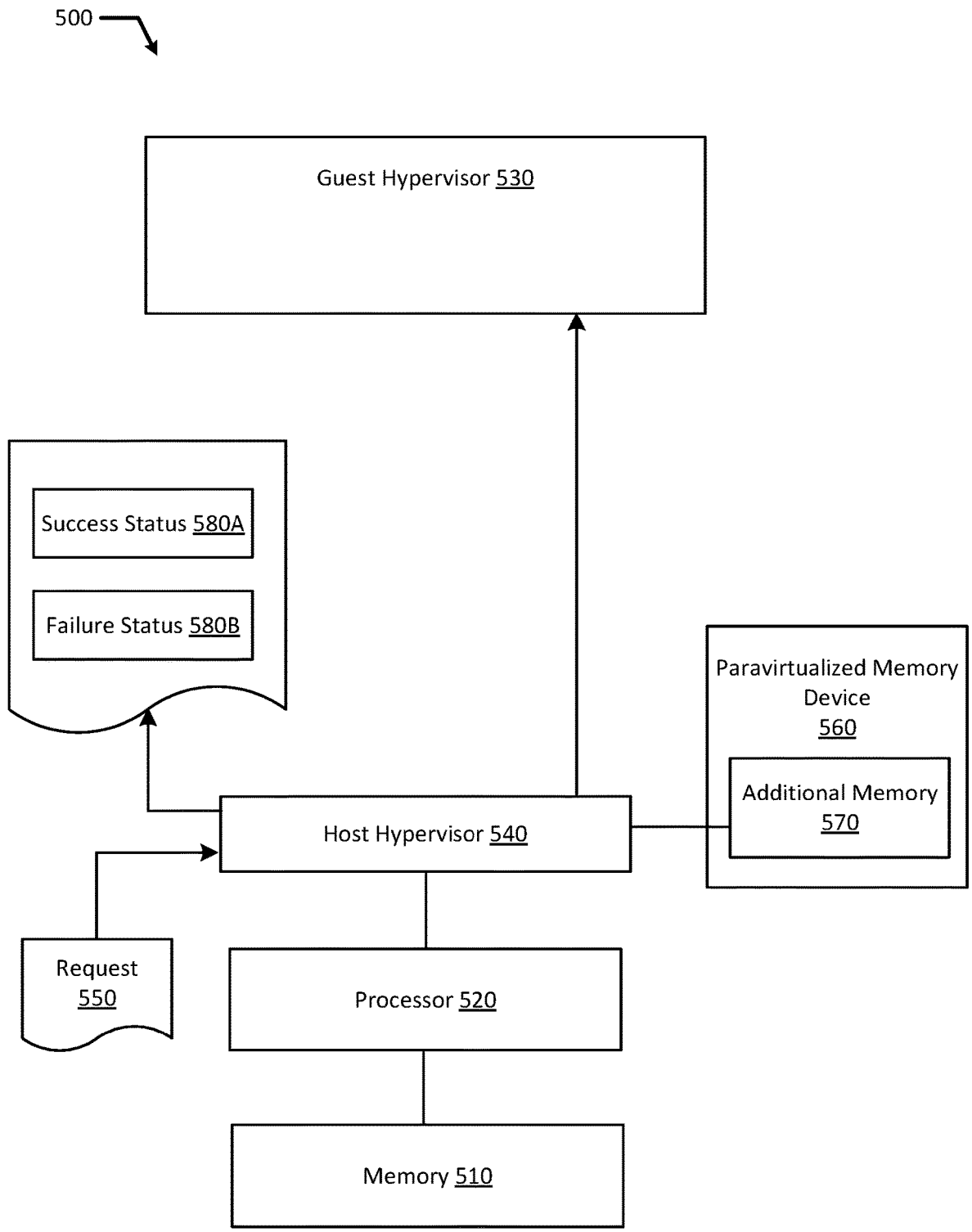
FIG. 5 illustrates a block diagram of an example nested virtual machine memory allocation system according to an example embodiment of the present disclosure.

FIG. 5 is a block diagram of an example nested virtual machine memory allocation system 500 according to an example embodiment of the present disclosure. The nested virtual machine memory allocation 500 includes a memory 510, at least one processor 520 in communication with the memory 510, a guest hypervisor 530, and a host hypervisor 540 executing on the at least one processor 520. The host hypervisor 540 is configured to receive a request 550 for additional memory 570 and request the additional memory 570 from a paravirtualized memory device 560. The host hypervisor 540 is also configured to allocate the additional memory 570 to the guest hypervisor 530 and report a status 580A-B of the request 550. The status 580A-B of the request 550 is one of a success status 580A and a failure status 580B.

Instead of the guest hypervisor 530 activating an out-of-memory killer to free up additional memory, the system 500 ensures that requesting and adding new physical memory to the virtual machine and adding the newly usable device memory to the nested VMs happens synchronously without the need of prior guest OS involvement (e.g., inflating a balloon) and without risking data loss or instabilities caused by memory freeing techniques or the OOM killer.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system comprising:
a memory;
at least one processor in communication with the memory;
a guest hypervisor; and
a host hypervisor executing on the at least one processor, wherein the host hypervisor is configured to:
receive a request for additional memory,
request the additional memory from a paravirtualized memory device,
allocate the additional memory to the guest hypervisor, and
report a status of the request, wherein the status of the request is one of a success status and a failure status,
wherein, while memory freeing techniques by the guest hypervisor remain deactivated, the host hypervisor requests and allocates the additional memory and reports the status of the request upon receiving the request for additional memory.

2. The system of claim 1, wherein the guest hypervisor is configured to:
send the request for additional memory to the host hypervisor, and
responsive to the host hypervisor reporting the success status, assign the additional memory to a nested virtual machine.

3. The system of claim 1, wherein the guest hypervisor includes a device driver configured to send the request for additional memory to the paravirtualized memory device, and wherein the paravirtualized memory device is configured to communicate with the host hypervisor to allocate the additional memory to the guest hypervisor.

4. The system of claim 1, wherein the guest hypervisor is configured to:
query an amount of memory available from the paravirtualized memory device,
responsive to the amount of memory being at least a required amount, launch a nested virtual machine, and
responsive to the amount of memory being less than the required amount, send the request for additional memory to the host hypervisor.

5. The system of claim 1, wherein the paravirtualized memory device is a balloon device.

6. The system of claim 1, wherein the paravirtualized memory device is associated with a non-uniform memory access node.

7. The system of claim 1, wherein the guest hypervisor includes a device driver and the device driver is configured to locate the paravirtualized memory device based on at least one of device location, device size, or history information from previous requests for additional memory.

8. The system of claim 1, wherein the request for additional memory indicates an amount of requested memory.

9. The system of claim 8, wherein a first portion of the amount of requested memory is satisfied by a first paravirtualized memory device, and a second portion of the amount of requested memory is satisfied by a second paravirtualized memory device.

10. A method comprising:
receiving, by a host hypervisor, a request for additional memory;
requesting, by the host hypervisor, the additional memory from a paravirtualized memory device;
allocating, by the host hypervisor, the additional memory to a guest hypervisor; and
reporting, by the host hypervisor, a status of the request, wherein the status of the request is one of a success status and a failure status,
wherein, while memory freeing techniques by the guest hypervisor remain deactivated, the host hypervisor requests and allocates the additional memory and reports the status of the request upon receiving the request for additional memory.

11. The method of claim 10, further comprising sending, by the guest hypervisor, the request for additional memory to the host hypervisor.

12. The method of claim 11, wherein the guest hypervisor sends the request via a device driver of the guest hypervisor.

13. The method of claim 10, further comprising:
responsive to the host hypervisor reporting the success status, assigning, by the guest hypervisor, the additional memory to a nested virtual machine.

14. The method of claim 13, wherein the guest hypervisor assigns the additional memory to the nested virtual machine via a device driver of the guest hypervisor.

15. The method of claim 13, wherein the guest hypervisor assigns the additional memory to the nested virtual machine by sending a deflation request to the paravirtualized memory device.

16. The method of claim 10, wherein the guest hypervisor includes a device driver, the method further comprising:
sending, by the device driver, the request for additional memory to the paravirtualized memory device;
receiving, by the paraviruralized memory device, the request; and
communicating the request, by the paravirtualized memory device, to the host hypervisor to allocate the additional memory to the guest hypervisor.

17. The method of claim 10, further comprising:
querying, by the guest hypervisor, an amount of memory available from the paravirtualized memory device;

responsive to the amount of memory being at least a required amount, launching a nested virtual machine; and responsive to the amount of memory being less than the required amount, sending, by the guest hypervisor, the request for additional memory to the host hypervisor.

18. The method of claim 10, further comprising:

receiving, by the guest hypervisor, the failure status;

responsive to receiving the failure status, sending, by the guest hypervisor, a secondary request for additional memory, wherein the secondary request is associated with a different paravirtualized memory device.

19. The method of claim 10, further comprising:

receiving, by the guest hypervisor, the failure status;

responsive to receiving the failure status, querying, by the guest hypervisor, a secondary amount of memory available from a different paravirtualized memory device;

responsive to the secondary amount of memory being at least a required amount, launching a nested virtual machine; and responsive to the secondary amount of memory being less than the required amount, sending, by the guest hypervisor, a secondary request for additional memory to the host hypervisor.

20. A non-transitory machine readable medium storing code, which when executed by a processor, is configured to cause a host hypervisor executing on the processor to:

receive a request for additional memory;

request the additional memory from a paravirtualized memory device;

allocate the additional memory to a guest hypervisor; and report a status of the request, wherein the status of the request is one of a success status and a failure status, wherein, while memory freeing techniques by the guest hypervisor remain deactivated, the host hypervisor requests and allocates the additional memory and reports the status of the request upon receiving the request for additional memory.

\* \* \* \* \*